(12) United States Patent
Draese et al.

(10) Patent No.: US 12,482,829 B2
(45) Date of Patent: Nov. 25, 2025

(54) ALUMINUM FOIL WITH IMPROVED WETTABILITY

(71) Applicants: Stephan Draese, Nettetal (DE); Thomas Graf, Bonn (DE); Oliver Seiferth, Köln-Zündorf (DE); Volker Schmitz, Rommerskirchen (DE)

(72) Inventors: Stephan Draese, Nettetal (DE); Thomas Graf, Bonn (DE); Oliver Seiferth, Köln-Zündorf (DE); Volker Schmitz, Rommerskirchen (DE)

(73) Assignee: Speira GmbH, Grevenbroich (DE)

( * ) Notice: Subject to any disclaimer, the term of this patent is extended or adjusted under 35 U.S.C. 154(b) by 285 days.

(21) Appl. No.: 18/167,981

(22) Filed: Feb. 13, 2023

(65) Prior Publication Data

US 2023/0197969 A1    Jun. 22, 2023

Related U.S. Application Data

(63) Continuation of application No. PCT/EP2021/072773, filed on Aug. 17, 2021.

(30) Foreign Application Priority Data

Aug. 17, 2020    (EP) .................... 20191345

(51) Int. Cl.
| | |
|---|---|
| *H01M 4/66* | (2006.01) |
| *B21B 1/40* | (2006.01) |
| *B21B 3/00* | (2006.01) |
| *B21B 45/02* | (2006.01) |
| *H01M 4/04* | (2006.01) |

(52) U.S. Cl.
CPC .............. *H01M 4/662* (2013.01); *B21B 1/40* (2013.01); *B21B 45/0239* (2013.01); *H01M 4/0404* (2013.01); *H01M 4/667* (2013.01); *B21B 2003/001* (2013.01)

(58) Field of Classification Search
None
See application file for complete search history.

(56) References Cited

U.S. PATENT DOCUMENTS

| | | | | |
|---|---|---|---|---|
| 4,949,566 A | * | 8/1990 | Eichelbaum | ......... C10M 145/36 |
| | | | | 72/236 |
| 9,742,009 B2 | | 8/2017 | Motoi et al. | |
| 2015/0099170 A1 | * | 4/2015 | Motoi | .................... H01G 11/68 |
| | | | | 428/606 |

FOREIGN PATENT DOCUMENTS

| | | | | |
|---|---|---|---|---|
| EP | 3590619 A1 | 1/2020 | | |
| JP | H06128583 A | 5/1994 | | |
| JP | H08157851 A | 6/1996 | | |
| JP | H108080 A | 1/1998 | | |
| JP | 2003165993 A | 6/2003 | | |
| JP | 2006150390 A | 6/2006 | | |
| JP | 2012230777 A | * | 11/2012 | ............. H01G 11/66 |
| JP | 2013211127 A | 10/2013 | | |
| JP | 6566133 B2 | 8/2019 | | |

OTHER PUBLICATIONS

Takei—JP 2012-230777 A—Jap. Search D3—MT—aluminum foil—2012 (Year: 2012).*
Metalworking Chemicals. "Performance Products" Dec. 31, 2010 (Dec. 31, 2010). Retrieved from the Internet: http://www.huntsman.com/performance_products/MediaLibrary/a_MC34853 I CF A3EA9A2E040EBCD2B6B7B06/Products _MC348531DOB9F A9A2E040EBCD2B6B7B06/Amines _MC348 531DOBECA9A2E040EBCD2B6B7B06/Morpholine DGA_R_ MC348531DOD20A9A2E040EBCD2B6B7B06/DIGL YCOLAMINE_Ragen_ MC348531D0DBAA9A2E040EBCD2B6B7B06/files/metalwo [retrieved on Jun. 17, 2014] XP055123809.

* cited by examiner

*Primary Examiner* — John Vincent Lawler
(74) *Attorney, Agent, or Firm* — Reinhart Boerner Van Deuren P.C.

(57) ABSTRACT

An aluminum foil is formed from an alloy of type AA1xxx, AA3xxx, and/or AA8xxx, which has a cold-solidified state and contains on its surface a rolling oil layer with a polyalkylene glycol or a compound containing a polyalkylene oxide structure. The aluminum foil has a thickness of 4 µm to 100 µm and can be easily coated with an electrode suspension for producing a battery film.

8 Claims, No Drawings

ALUMINUM FOIL WITH IMPROVED WETTABILITY

CROSS-REFERENCE TO RELATED PATENT APPLICATIONS

This patent application is a continuation of International Application No. PCT/EP2021/072773, filed on Aug. 17, 2021, which claims the benefit of priority to European Patent Application No. 20191345.6, filed Aug. 17, 2020, the entire teachings and disclosures of both applications are incorporated herein by reference thereto.

FIELD

The invention relates to an aluminum foil, the further processing thereof to form a battery film, and the use of the aluminum foil to produce a battery film.

BACKGROUND

Batteries such as lithium ion batteries are used in particular as a storage medium for electrical energy in electromobility. The performance of such batteries depends on the speed and efficiency of the charge and mass transport processes during discharging and charging of the batteries. The transport processes are determined, inter alia, by the structure of the electrodes in the battery.

Electrodes and in particular the cathodes frequently comprise a substrate made of a metal foil, which additionally has an electrode coating or a cathode mass on the surface. The chemical-physical processes at the interface between the substrate and the electrode coating have proven here to be crucial for the performance of the battery. In order to improve the properties of the battery, the surface properties of the substrate must therefore be adapted with regard to optimal adhesion of the electrode coating as well as the most secure contact possible.

Aluminum foils for use in battery electrodes which serve as a substrate in electrodes are typically produced via a rolling process. Aluminum foils are generally provided with a cooling lubricant during the rolling process in order to reduce the friction in the roll gap, in order to cool aluminum and the rolls, and in order to reduce the roll wear and to prevent the rolled product from sticking during the rolling process.

If a coating of the aluminum foil with an electrode material is carried out in the rolled and lubricated, cold-solidified state, the residual occupancy of the surface with the cooling lubricant and further residues from the rolling process such as particles, abrasion and reaction products may lead to wetting problems and adhesion problems of the electrode coating on the aluminum foil. In addition, the cooling lubricant distribution on the surface of the aluminum foil after the rolling may be strongly uneven so that portions with a locally excessive occupation of cooling lubricant are formed in which an optimal coating and contacting is not possible.

For the use of aluminum foils for batteries, the mass of cooling lubricant should therefore be reduced or removed before coating with the electrode coating. For this purpose, for example, the aluminum foil can be annealed at low temperatures in order to evaporate or oxidize the remaining cooling lubricant, wherein the aluminum foil is softened. Especially during annealing at low temperatures, however, there is the risk that residues of the cooling lubricant remain on the aluminum foil and thus further processing, for example coating, is problematic. In particular, even after the annealing, due to uneven occupation with cooling lubricant, a locally strongly varying wettability may still occur. Likewise, the oxide layer may grow on the surface by heating the aluminum foil, wherein a higher thickness of the oxide layer is produced in particular in the edge regions. Due to the deviations in the oxide layer thickness, different transition resistances can arise at the interface to the aluminum foil after calendering of the electrode coating. In addition, a considerable amount of time is required with the annealing, wherein long annealing times are necessary for degreasing, in particular at low temperatures, and increased costs arise.

Likewise, aluminum foils can be chemically degreased in order to condition the surface for a coating. For this purpose, the cooling lubricant is removed in a pickling grease and the roll oxide layer is dissolved. In the subsequent rinsing process, a thicker porous hydroxide layer is formed on the surface of the aluminum foil. These correspondingly conditioned aluminum foils are characterized by homogeneous surface properties and by high wettability, whereby the foils are also suitable for coating with water-based suspensions. However, this chemical degreasing also creates comparatively high process costs As an alternative surface treatment for degreasing and conditioning the surface, flame degreasing of the aluminum foil can be carried out. However, the high energy inputs necessary with the flame degreasing can lead to an undesired softening of the aluminum foil and to a significant growth of the oxide layer, which results in poorer contacting of the surface of the aluminum foil. Similar results result from NIR and plasma treatment.

Corona treatment of the surface of an aluminum strip or of an aluminum foil is also suitable for the degreasing and conditioning thereof. In particular, the corona treatment also increases the surface tension.

BRIEF SUMMARY

It is an object of the invention to provide an aluminum foil for battery electrodes which does not require a cost-intensive conditioning of the surface and which has good wettability and adhesion for different types of electrode coatings and at the same time allows effective electrical contact with the electrode coating. Moreover, the surface produced should have good corrosion resistance against the electrolytes used in a battery cell.

This object is achieved by an aluminum foil made of an alloy of type AA1xxx, AA3xxx, and/or AA8xxx, which has a cold-solidified state, which has, on its surface, a polyalkylene glycol or a compound containing a polyalkylene oxide structure.

The invention further relates to a method for producing the aforementioned battery film.

The invention lastly relates to the use of the aluminum foil as a battery film.

DETAILED DESCRIPTION

The aluminum foil according to the invention can consist of an alloy of the AA 1xxx, AA 3xxx, and/or AA 8xxx type. As a result of the low proportions of alloying additions, aluminum alloys of the AA 1xxx type only cause very low undesired chemical processes between the electrode coating and the surface of the aluminum foil and thus have only low corrosion effects. In this case, it is possible, among other things, to use alloys of the AA 1050, AA 1100, AA 1200 or AA 1085 type, which can have improved mechanical characteristics compared to pure aluminum. The mechanical properties can additionally be improved by using alloys of type AA 3xxx and AA 8xxx.

It has been found that the surface of an aluminum foil has been produced during cold rolling using a cooling lubricant that is substantially free of fatty acids and fatty alcohols but has a polyalkylene glycol or a compound containing a polyalkylene oxide, has a high surface energy and thus an optimal surface for use as a substrate in an electrode of a battery can be achieved. The surface of the aluminum foil is substantially free of a fatty acid and free of a fatty alcohol. These substances are generally contained in cooling lubricants and are consequently present directly after the cold rolling of aluminum on the surface thereof as components of the residual cooling lubricant. Substantially free of a fatty acid and free of a fatty alcohol means that less than 1 mg/m$^2$ of a fatty acid and/or a fatty alcohol is provided in each case on a surface side of the aluminum foil.

The surface of the aluminum foil is only adjusted by the rolling process and, in particular after completion of cold rolling, undergoes no heat treatment, flame degreasing, chemical degreasing and/or corona treatment. The aluminum foil has good initial adhesion for an electrode coating.

The aluminum foil therefore advantageously has a cold-solidified state, whereby the aluminum foil according to the invention differs from aluminum foils for battery electrodes, which were conditioned, for example, by heat treatment or flame degreasing, by means of the cold-solidified structure.

In the production of aluminum strips and foils, rolling emulsions and rolling oils are used as cooling lubricants which have a great influence on the economic viability of production and the quality of the products. During rolling, the coefficient of friction between the working roller and the material being rolled should not be too high or too low. A low coefficient of friction improves the lubrication in the roll gap so that energy, frictional heat and roll wear in the rolling process are reduced.

The aluminum foil according to the invention is obtained by cold rolling an aluminum strip in the presence of a cooling lubricant, which contains a mineral-oil-based or synthetic base oil, and a polyalkylene glycol and/or a compound containing a polyalkylene oxide structure and is substantially free from fatty acids and fatty alcohols.

The obtained aluminum foil is therefore free of visually perceptible defect images caused by fatty acids and fatty alcohols and has a surprisingly high wettability for N-methyl-2-pyrrolidone (NMP). This is an indicator of the coatability of the aluminum foil with an electrode coating. Furthermore, the aluminum foil according to the invention does not require corona treatment if a high surface energy of the surface of the aluminum foil is desired.

The cooling lubricant used according to the invention is oil-soluble. It is not miscible with water. The cooling lubricant according to the invention is free of straight-chain olefins, in particular free of alpha-olefins having 6 to 40 carbon atoms.

Substantially free of a fatty acid in the sense of the cooling lubricant used here means that a fatty acid is contained as a lubricating additive in a proportion of at most 0.2 wt. %, preferably at most 0.1 wt. %, in relation to the mass of the cooling lubricant.

Substantially free of a fatty alcohol in the sense of the invention means that a fatty alcohol is contained as a lubricating additive in a proportion of at most 0.4 wt. %, preferably at most 0.3 wt. %, in relation to the mass of the cooling lubricant. If the fatty acid proportion and/or the fatty alcohol proportion in the lubricant according to the invention are above the maximum value specified above, the wetting properties of the aluminum product rolled therewith are compromised.

Polyalkylene glycols to be used according to the invention comprise customary polyalkylene glycols and compounds having a polyalkylene glycol structure such as polyoxyalkylene fatty alcohol ethers (ethoxylated fatty alcohol). The alkylene group in the polyalkylene glycol or polyalkylene oxide may be ethylene, propylene or butylene (polyethylene glycols, polypropylene glycols, polybutylene glycols). The fatty alcohol may comprise 8 to 20 carbon atoms. The fatty alcohol group may be, for example, decanol, lauryl alcohol, myristyl alcohol, cetyl alcohol, stearyl alcohol. These compounds have lubricating and cooling properties during the cold rolling of aluminum. The term polyalkylene glycol used below comprises polyalkylene glycols and compounds having a polyalkylene glycol structure.

The polyalkylene glycols used in the cooling lubricant can have a kinematic viscosity of 5 mm$^2$/s to 250 mm$^2$/s, preferably 10 mm$^2$/s to 200 mm$^2$/s at 40° C. The polyalkylene glycols used according to the invention are present as liquid above 5° C. and are therefore easy to meter. They may be insoluble or soluble in water.

Particularly preferably, ethoxylated fatty alcohols such as tetraethylene glycol monododecyl ethers are used as polyalkylene glycols or a compound containing polyalkylene oxide. Corresponding polyalkylene glycols are commercially available.

The proportion of the polyalkylene glycol in the cooling lubricant may be up to 10 wt. %, in particular 0.01 to 8 wt. % and particularly preferably 0.01 to 5 wt. %, in each case in relation to the mass of the rolling oil. The polyalkylene glycol therefore replaces the fatty acid and fatty alcohol additives usually present in cold-rolling lubricants. The cooling lubricant according to the invention has a good lubricating effect or tribological effect without the aforementioned disadvantageous effects of fatty acids and fatty alcohols.

The cooling lubricant used is based on a hydrocarbon base oil with a boiling point in the range of 180° C. to 300° C., measured according to DIN EN ISO 3405. The base oil contains straight-chain and branched hydrocarbons. The base oil may comprise a hydrocarbon mixture. The proportion of aromatics therein may preferably be less than 1 wt. %, in relation to the mass of the base oil. The base oil may be a mineral oil or a synthetic oil. It may comprise n-paraffins and/or isoparaffins.

The kinematic viscosity of this low-aromatics hydrocarbon mixture may be 1.5 to 3.6 mm$^2$/s at 20° C. This kinematic viscosity provides good flow properties in the cold-rolling stand and enables uniform lubrication and cooling. The proportion of the base oil in the cooling lubricant according to the invention may account for 90 wt. % and more, in relation to the mass of the cooling lubricant. The proportion of the base oil may be, for example, 90 wt. % to 99 wt. % of the mass of the cooling lubricant.

The cooling lubricant may comprise customary additives for increasing the high-pressure lubricating properties, antioxidants and conductivity improvers.

Additives for increasing the high-pressure lubricating properties comprise esters of straight-chain saturated $C_{10-14}$ carboxylic acids. These comprise, for example, butyl stearate and methyl dodecanoate. Methyl dodecanoate is particularly preferred. These may be contained in an amount of up to 10 wt. %, preferably 1 to 8 wt. %, in relation to the mass of the cooling lubricant.

Suitable antioxidants comprise sterically hindered monovalent, divalent and trihydric phenols and polynuclear phenols, in particular tert-butylphenols. A typical representative of this group is the methylene-4,4'-bis-(2,6-di-tert-butylphenol). Further suitable antioxidants comprise amines such as diphenylamine, phenyl-α-naphthylamine, p, p'-tetramethyldiaminodiphenylmethane and N, N'-diphenyl-p-phenyldiamine. An aforementioned antioxidant can be used in combination with further antioxidants such as sulfides and polydisulfides in customary concentrations.

The cooling lubricant used allows the further processing of the aluminum product obtained after the cold rolling for a series of applications without a corona treatment being required. Despite the corona treatment not being carried out, a surface energy sufficient for many applications on the surface of the aluminum foil is achieved. In addition, the surface of the aluminum foil has a high wettability for water and N-methyl-2-pyrrolidone (NMP).

On its surface, the aluminum foil contains residues of the polyalkylene glycol used in the cooling lubricant. These residues are embedded in the base oil. The amount of the polyalkylene glycol or the compound containing a polyalkylene oxide structure on the surface of the aluminum foil according to the invention after the cold rolling can be up to 5 mg/m$^2$, for example, 0.01 mg/m$^2$ to 5 mg/m$^2$.

It has been found that by using the cooling lubricant described here, a significant reduction in the number of visually perceptible defect images on the aluminum foils produced is also achieved. This is likely due to the fact that the rolling oil components do not form deposits that are difficult to remove on the material being rolled. The omission of fatty alcohols appears to increase this reduction further still.

The surface tension of the aluminum foil can be adjusted specifically for various types of electrode coatings via the type of the polyalkylene glycol used in the cooling lubricant or the compound containing a polyalkylene oxide structure. In particular, the surface tension of the aluminum foil is adjusted via the type of the polyalkylene glycol used in the cooling lubricant or the compound containing a polyalkylene oxide structure, such that the surface tension of the aluminum foil is approximately the same as the surface tension of the suspension of the electrode coating. Advantageously, the surface tension of the aluminum foil is "approximately the same" as the surface tension of the suspension for the electrode coating when it is in a range of ±20% of the surface tension of the suspension for the electrode coating.

The surface tension of corresponding suspensions is determined, inter alia, by the solvents, wherein non-polar NMP is often used with optional admixtures for electrode materials. Surprisingly, it has been found that by way of the type of production of the aluminum foil according to the invention with a selected cooling lubricant, comparatively high surface tensions can be obtained so that the aluminum foil according to the invention can also be used with suspensions with solvents of higher polarity and even purely water-based suspensions.

In one embodiment of the invention, the contact angle in the drop test on the surface of the aluminum foil is from 75° to 50°. With the drop test, a drop of deionized water with a drop volume of 5 µl is applied to the surface of the aluminum foil. Under indoor climate conditions (22° C.±2° C., 30%±10% rel. humidity), the contact angle of the drop is determined with the Drop Shape Analyzer DSA10 contact angle measuring instrument, which is commercially available from the company Krüss. The contact angle in the drop test is a further indicator of the wettability and thus the suitability of the aluminum foil for use as a substrate in battery electrodes, wherein smaller contact angles indicate a better wettability. With contact angles in the drop test of 85° to 45°, a multitude of suspensions for the aluminum foil can be used reliably. Good results are achieved in particular in the range of 55° to 85° and in the range of 65° to 80°.

To produce the electrode foil, the aluminum foil can typically be coated as a substrate in a slot die coating process. For the most accurate adjustment of the wet film thickness and the coating width as well as to achieve a homogeneous coating, a good wettability of the surface of the aluminum foil with a suspension of the electrode coating (with a slurry) is required. The wettability depends here on the surface tensions of the suspension and the aluminum foil, wherein the surface tension of the aluminum foil is advantageously approximately the same as the surface tension of the suspension or higher than the surface tension of the suspension. By using the type and the quantity of the polyalkylene glycol which is used in the cooling lubricant described here, or of the compound containing a polyalkylene oxide structure, the surface tension of the aluminum foil can be set reliably without any growth of the oxide layer and also can be influenced by the specific selection of the energy input such that the surface of the aluminum foil is suitable for different compositions of electrode coating suspensions.

Because no pickling takes place, the homogeneous and comparatively thin roll oxide layer is obtained. This structure of the oxide layer enables reliable penetration of the oxide layer through an active component of the electrode material, thereby ensuring good electrical connection of the aluminum foil in the battery. The comparatively dense oxide layer that is present allows good passivation and thus high corrosion protection of the aluminum foil. The aluminum foil according to the invention is also outstandingly suitable for ultrasonic welding due to the specific topography from the rolling process and the low oxide layer thickness after the surface treatment.

In a further embodiment, the aluminum foil has a passivation layer, whereby corrosion at the interface between the aluminum and the electrolyte is prevented. Good passivation properties of the aluminum foil are achieved with the surface treatment, so that passivation layers (e.g., comprising AlF$_3$) can form in particular with the electrolyte components of the battery cell for improved corrosion protection.

In a further embodiment of the invention, an electrode coating is arranged at least on a portion of the surface of the aluminum foil. Such an electrode coating comprises in particular at least one metal oxide, for example a lithium-cobalt(III) oxide. With the electrode coating, the aluminum foil is in particular formed as a cathode material.

The following examples serve for further explanation of the invention.

EXAMPLES

Example 1—Determination of the Coefficients of Friction of Various Lubricants

The lubricating properties of the cooling lubricant according to the invention were determined using an MTM2 Mini-Traction machine from the company PCS Instruments in the standard configuration with a steel ball exerting a load (diameter 19.05 mm) and an aluminum test disk rotatable at different speeds. The load on the steel disk through the ball (¾" ball bearing steel AISI 52100 (100Cr6, 1.3505)) was set to 40 N (0.5 GPa contact pressure) and the coefficient of friction (CF) at different rolling speeds. The two mean values (MW) of the coefficients of friction measured at rolling speeds of 0.2 to 200 m/min are shown in Table 1 below. The disk was formed from an aluminum alloy AA1XXX. The sliding/roll ratio (SRR) during the test was 50%. After the Tribotest, the wettability of the aluminum test disks with respect to water was tested. For this purpose, drop tests with a drop volume of 5 µl with demineralized water were carried out on the disks next to the running track. The standardized test procedure corresponds to the internal work instruction "Hydro CO 0620". The kinematic viscosity was measured according to DIN 51562.

Sample 6 shows acceptable wetting with water, sample 7 a good wetting and sample 8 very good wetting with water. Sample 10 provides hardly any abrasion and hardly any running track on the ball. Samples 11 and 12 provide little running track on the ball.

Example 2—Determination of the Wetting Angle after Cold Rolling with Different Lubricants In the following experiment too, an aluminum foil of an alloy of the AA1XXX type was used for determining the wetting angle on the surface of the foil. The contact angles (CA) were measured during wetting with water and with

TABLE 1

| Lubricant sample | Viscosity $mm^2/s$ | CF MW 0.2-200 m/min | Drop size 5 µl water in mm | Comments |
|---|---|---|---|---|
| 1 base oil | 1.9 | 0.07; 0.08 | 3.1 | Lubricating film formation suboptimum metal soap formation |
| 2 base oil + 0.9% fatty acid + 0.9% methyl laurate | 1.9 | 0.06; 0.05 | 2.5 | good lubricating film; more abrasion in the KSS but clean disk |
| 3 rolling oil with 1% PAG*(visco 20 $mm^2/s$ at 40° C.) | 1.9 | 0.05; 0.05 | 3.1 | better lubricating film formation than pure rolling oil |
| 4 rolling oil with 2% PAG* (visco 20 $mm^2/s$ at 40° C.) | 1.9 | 0.04; 0.04 | 3.5 | lubricating film formation good; hardly any running track on the ball |
| 5 rolling oil with 4% PAG* (visco 20 $mm^2/s$ at 40° C.) | 2.0 | 0.03; 0.03 | 3.5 | hardly any abrasion |
| 6 rolling oil with 2% PAG enth. compound** (visco 20 $mm^2/s$ at 40° C.) | 1.9 | 0.06; 0.06 | 3.3 | good lubricating film formation; slight abrasion; acceptable wetting |
| 7 rolling oil with 5% PAG enth. compound** (visco 20 $mm^2/s$ at 40° C.) | 2.0 | 0.05; 0.06 | 6.6 | good lubricating film formation; slight abrasion; good wetting |
| 8 rolling oil with 10% PAG enth. compound** (visco 20 $mm^2/s$ at 40° C.) | 2.2 | 0.03; 0.03 | 10.7 | good lubricating film formation; hardly any abrasion, very good wetting |
| 9 rolling oil with 5% PAG***(visco 33 $mm^2/s$ at 40° C.) | 2.1 | 0.06; 0.08 | 3.6 | lubricating film formation good |
| 10 rolling oil with 5% PAG***(visco 57 $mm^2/s$ at 40° C.) | 2.1 | 0.09; 0.08 | 4.5 | lubricating film formation good; hardly any abrasion; hardly any running track on the ball |
| 11 rolling oil with 5% PAG***(visco 77 $mm^2/s$ at 40° C.) | 2.1 | 0.07; 0.07 | 3.5 | lubricating film formation good; minor running track on the ball |
| 12 rolling oil with 5% PAG****(visco 175 $mm^2/s$ at 40° C.) | 2.3 | 0.08; 0.06 | 3.3 | lubricating film formation good; minor running track on the ball |

*PAG = an EO/PO copolymer with a kinematic viscosity of 20 $mm^2/s$ at 40° C.
**a polyethylene glycol monododecyl ether having a kinematic viscosity of 20 $mm^2/s$ at 40° C.
***in each case: poly(proplylene glycol) monobutyl ether with kin. viscosities of 33, 57 and 77 $mm^2/s$ at 40° C.
****mixture of polypropylene glycols with kin. viscosities of 75 and 225 $mm^2/s$ at 40° C., viscosity of the mixture is 175 $mm^2/s$ at 40° C.

The formation of lubricating film with the base oil alone is sub-optimum; there is metal soap formation. The lubricant sample 2 provides a good lubricating film with more abrasion, but with a clean disk. The lubricant sample 3 according to the invention provides a better lubricating film formation. The same applies to the sample 4, which moreover hardly shows a running track on the ball. This also applies to sample 5 which provides hardly any abrasion. Samples 6 to 12 show a good lubricating film formation. Samples 6 and 7 slight abrasion, sample 8 shows hardly any abrasion.

NMP. The wetting angle or contact angle was determined in the drop test at a drop volume of 5 µl with demineralized water or NMP with the Drop Shape Analyzer DSA 10 by Krüss GmbH, Hamburg, Germany. The measurements are mean values of individual measurements at four different positions on the surface of the foil sample. The results of the measurements are shown in Table 2 below. Furthermore, the surface energy (SFE) was determined by determining the contact angle. Corresponding values are given in Table 2.

TABLE 2

| | CA vs H$_2$O | SFE (total) mN/m | CA vs NMP |
|---|---|---|---|
| Rolling oil (base oil) | 71° | 30 | 32° |
| Base oil with 0.1% fatty acid LS | 87° | 26 | 38° |
| Base oil with 0.5% fatty acid LS | 111° | 20 | 67° |
| Base oil with 1% fatty alcohol C12 | 78° | 26 | 40° |
| Base oil with 1% fatty alcohol C12/C14 (70:30) | 92° | 22 | 46° |
| Base oil with 2% fatty alcohol C12/C14 (70:30) | 85° | 22 | 43° |
| Base oil with 0.1% PAG-containing compound* (visco 20 mm$^2$/s at 40° C.) | 74° | 34 | 20° |
| Base oil with 0.5% of a PAG-containing compound*(visco 20 mm$^2$/s at 40° C.) | 75° | 29 | 24° |
| Base oil with 1% of a PAG-containing compound* (visco 20 mm$^2$/s at 40° C.) | 69° | 32 | 25° |
| Base oil with 0.5% PAG**(visco 77 mm$^2$/s at 40° C.) | 53° | 45 | 20° |
| Base oil with 5% PAG**(visco 77 mm$^2$/s at 40° C.) | 62° | 37 | 17° |

*polyethylene glycol monodecyl ether
**polypropylene glycol) monobutyl ether

The results shown in Table 2 demonstrate that the lubricants with a compound having a polyalkylene oxide structure lead to aluminum foils with considerably lower contact angles, for example for NMP. This can be helpful for certain applications, in particular applications as a battery film.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An aluminum foil having a thickness of 4 μm to 100 μm formed from an alloy of type AA1xxx, AA3xxx, and/or AA8xxx, which has a cold-solidified state, and which has on its surface a rolling oil layer which contains a polyalkylene glycol and/or a compound containing a polyalkylene oxide structure, wherein the alkylene group in the polyalkylene glycol or polyalkylene oxide is ethylene, propylene or butylene and the polyalkylene glycol or the compound containing a polyalkylene oxide structure is contained on a surface side of the aluminum foil in an amount of 0.01 mg/m$^2$ to 5 mg/m$^2$, and wherein the proportion of the polyalkylene glycol or the compound containing a polyalkylene oxide structure in the rolling oil layer is up to 10 wt. % in relation to the mass of the rolling oil layer.

2. The aluminum foil of claim 1, wherein the surface of the aluminum foil was not subjected to a corona treatment after the cold rolling.

3. The aluminum foil of claim 1, wherein the contact angle in the drop test with NMP on the surface of the aluminum foil is less than 32°, in particular 24° to 15°, wherein the drop test as described on page 10, lines 17 to 22 is performed with NMP instead of demineralized water.

4. The aluminum foil of claim 1, wherein the surface of the aluminum foil in each case on a surface side has less than 1 mg/m$^2$ of a fatty acid and a fatty alcohol.

5. The aluminum foil of claim 1, wherein the aluminum foil has a thickness of from 6 μm to 50 μm.

6. The aluminum foil of claim 1, wherein the surface of the aluminum foil in each case on a surface side has less than 1 mg/m$^2$ of a fatty acid and/or a fatty alcohol.

7. A method for producing a battery film, comprising:
subjecting an aluminum strip of an alloy of type AA1xxx, AA3xxx, and/or AA8xxx in the presence of a cooling lubricant to a cold rolling to form an aluminum foil of a thickness of 4 μm to 100 μm, wherein the cooling lubricant is based on a mineral oil or a synthetic oil, polyalkylene glycol and/or a compound containing a polyalkylene oxide structure, wherein the alkylene group in the polyalkylene glycol or polyalkylene oxide is ethylene, propylene or butylene, and contains a fatty acid as lubricating additive in a proportion of at most 0.2 wt. % and a fatty alcohol as lubricating additive in a proportion of at most 0.4 wt. %, in relation to the mass of the cooling lubricant, and
coating the surface of the aluminum foil with an electrode coating mass,
wherein the polyalkylene glycol or the compound containing a polyalkylene oxide structure is contained on a surface side of the aluminum foil in an amount of 0.01 mg/m2 to 5 mg/m2, and
wherein the proportion of the polyalkylene glycol or the compound containing a polyalkylene oxide structure in the cooling lubricant is up to 10 wt. % in relation to the mass of the rolling oil.

8. A method comprising the step of utilizing the aluminum foil of claim 1 for producing a battery film.

* * * * *